A. F. ZAHM.
PROCESS OF SOLIDIFYING AND TOUGHENING THE HUB PORTION OF AERIAL PROPELLERS AND THE LIKE.
APPLICATION FILED APR. 6, 1916.

1,246,029.

Patented Nov. 6, 1917.

Inventor
ALBERT F. ZAHM.

By

Attorney

UNITED STATES PATENT OFFICE.

ALBERT F. ZAHM, OF BUFFALO, NEW YORK, ASSIGNOR TO THE CURTISS MOTOR CO., A CORPORATION OF NEW YORK.

PROCESS OF SOLIDIFYING AND TOUGHENING THE HUB PORTION OF AERIAL PROPELLERS AND THE LIKE.

1,246,029. Specification of Letters Patent. Patented Nov. 6, 1917.

Application filed April 6, 1916. Serial No. 89,374.

*To all whom it may concern:*

Be it known that I, ALBERT F. ZAHM, a citizen of the United States, residing at Buffalo, in the county of Erie and State of New York, have invented certain new and useful Improvements in Processes of Solidifying and Toughening the Hub Portion of Aerial Propellers and the like, of which the following is a specification.

My present invention has relation to an improved process for solidifying, toughening and hardening wood and more especially a given or predetermined portion of the wood without altering or in any way treating such portion or portions thereof as may best, for various reasons, be allowed to remain untreated.

The foregoing method of partial treatment is particularly desirable in the aeronautical art in view of the peculiar requisites of an aircraft propeller. It is extremely essential that the hub portion of the propeller be reinforced throughout to effectually withstand the stress and strains imposed thereon by the sometimes sudden and variable impulses incident to the irregular and non-uniform operation of the aircraft motor, as well as to transmit the heavy driving torque of a powerful high speed aeronautical motor. I contemplate, therefore, as the primary object of the present invention, an improved process or method which consists fundamentally in reducing a solidifying medium to liquid form; impregnating the hub portion with the liquid, maintaining the hub in a heated state during impregnation and resolidifying the impregnated medium by permitting the element to cool and dry. I further contemplate the utilization of fluid under pressure in effecting impregation; maintaining the impregnating fluid under pressure for a predetermined period of time; and maintaining a pressure of a predetermined value during impregnation.

For the purpose of illustrating the manner in which my improved method or process is carried into effect, I have shown in the accompanying drawing an apparatus of a construction designed to first heat the hub portion of the propeller and thereafter impregnate, under pressure, the said hub portion with an extraneous reinforcing medium. The said apparatus, however, forms no part of the invention hereinafter claimed but is covered in my copending application Serial No. 88,096.

Figure 1:
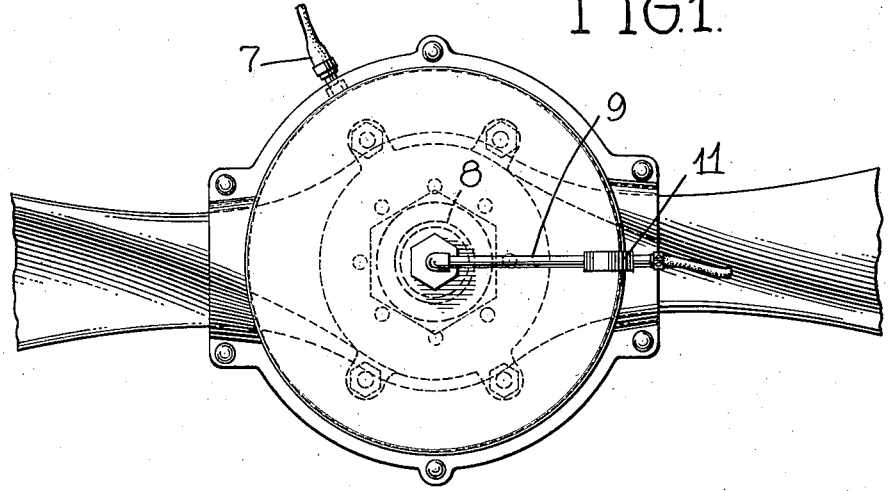

In said drawing, wherein like characters of reference designate like or similar parts throughout the several views:

Figure 1 is a top plan view of the apparatus, and

Figure 2:
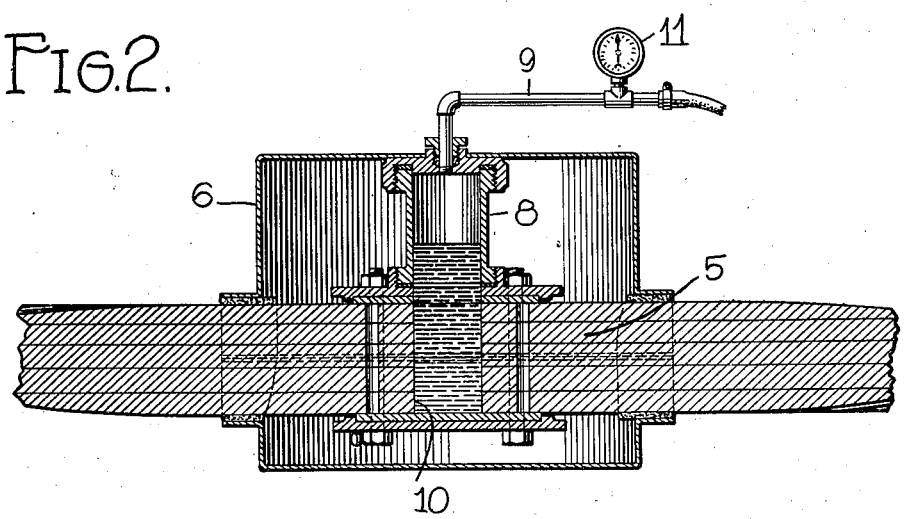

Fig. 2 a longitudinal sectional view.

In carrying the process into effect, the hub portion of the propeller designated 5 is heated to a predetermined temperature, *i. e.*, a temperature approximately that of the impregnating medium in its liquid form. That the heat may be directed to the hub portion, the heating chamber 6, forming a part of the apparatus, is mounted to inclose and embrace said hub portion as illustrated to advantage in Fig. 2. A heat induction pipe 7 discharges interiorly of the chamber 6 as shown.

After heating the said hub portion to the temperature desired, the impregnating apparatus designated in its entirety by the numeral 8 is utilized to force the impregnating medium (preferably liquid resin) into the fibers, interstices and crevices of the heated hub. Air, under pressure, is admitted to the impregnating apparatus via a pipe 9 discharging thereinto at a point directing the pressure onto the impregnating medium contained therein.

The usual hub opening of the propeller, denoted 10, forms with the impregnating apparatus 8 a container for the impregnating medium. The impregnating medium, originally of a solid form, is reduced to its liquid form and placed within the container. Since the hub of the propeller is pre-heated by the heat contained in the chamber 6, it is evident that the liquid confined to the container may be forced, under pressure, into the fibers of the wood. A gage 11 operatively associated with the air induction pipe 9 will indicate the air pressure and accordingly permit of variation in the depth of impregnation. During impregnation, the pressure should be applied to the impregnating medium for a specified or predetermined period of time or for a length of time sufficient to insure the desired entry of the medium into the pores of the hub. In the process of impregnation, the level of the liquid is never to fall below the plane of the face of the propeller to thus insure an equal distribution of the liquid therethrough. Apparatus 8 should be of a size to contain in itself the full amount of impregnating medium required.

After impregnation, both the heating chambers 6 and the impregnating apparatus 8, are removed from engagement with the propeller and the hub portion thereof permitted to cool and dry. As the hub cools, the reinforcing medium impregnated thereinto congeals and resolidifies, thus accordingly solidifying, toughening and hardening the hub portion, and the hub portion only, of the propeller.

Briefly, the process hereinbefore described consists in first heating the fibrous material to the temperature desired, next transforming a reinforcing solid into liquid form, next impregnating the heated material with the liquefied medium by the application of pressure thereon, and finally resolidifying the reinforcing medium by permitting the material to cool and dry.

As stated, the process consists essentially in solidifying and toughening the hub portion of a fibrous rotatable element by impregnating the said hub portion with an extraneous reinforcing medium. The impregnating medium in its original form is hard and solid and must be reduced to its liquid form before impregnation can take place. It is only to facilitate impregnation that the fibrous material is pre-heated since it is obvious impregnation may readily take place so long as the material is maintained at the melting temperature of the reinforcing medium and the requisite pressure applied.

While I have described a specific process for solidifying and toughening fibrous material, it is to be understood that many varitions in the process may be resorted to in actual practice providing such changes come within the scope of the subjoined claims.

What is claimed is:

1. The herein described process of solidifying and toughening the hub portion of a rotatable element which consists in first heating the said hub portion and thereafter impregnating the said heated portion with an extraneous reinforcing medium.

2. The herein described process of solidifying and toughening the hub portion of a fibrous rotatable element which consists in heating the said hub portion and thereafter impregnating, under pressure, the said heated portion with an extraneous reinforcing medium.

3. The herein described process of solidifying and toughening the hub portion of a fibrous element which consists in reducing the solidifying medium to liquid form, impregnating the hub portion with the liquefied medium, and thereafter resolidifying the liquid medium.

4. The herein described process of solidifying and toughening a specified portion of a fibrous element without solidifying and toughening the element in its entirety which consists in transforming a solid into liquid form, impregnating said specified portion with the liquefied medium, maintaining the element in a heated state during impregnation and resolidifying the impregnated medium by permitting the element to cool and dry.

5. The herein described process of solidifying and toughening a fibrous element which consists in liquefying an originally solid reinforcing medium, pre-heating the element to a temperature approximately equal to the melting temperature of the reinforcing medium, impregnating the heated element with the liquid medium, and thereafter permitting resolidification of the medium.

6. The herein described process of solidifying and toughening the hub portion of a rotatable element which consists in impregnating said hub portion with an extraneous reinforcing medium and maintaining the said medium under a pressure during impregnation.

7. The herein described process of solidifying and toughening the hub portion of a fibrous rotatable element which consists in directing, under pressure, into the hub opening a reinforcing medium in liquid form whereby that portion of the rotatable element in proximity to said hub opening is impregnated with said liquid according to the pressure applied.

8. The herein described process of solidifying and toughening a particular portion of an integral fibrous structure which conists in first forming an opening in that particular portion of the structure to be solidified and toughened, thereafter heating that portion of the structure to be toughened, and finally directing, under pressure, a heated reinforcing medium in liquid form into said opening that the heated portion of the element in proximity to said opening may be impregnated with said reinforcing medium.

9. The herein described process of solidifying and toughening a particular portion of an integral structure without solidifying and toughening the structure as a whole which consists in forming an opening in that portion of the structure to be treated, heating the structure in proximity to said opening and impregnating the heated portion of the structure with an extraneous reinforcing substance by directing the substance, under pressure, into said opening.

In testimony whereof I affix my signature.

ALBERT F. ZAHM.